Patented Mar. 20, 1923.

1,449,108

UNITED STATES PATENT OFFICE.

FRIEDRICH HAYDUCK, OF WILMERSDORF, GERMANY, ASSIGNOR TO THE FLEISCHMANN COMPANY, OF NEW YORK, N. Y., A CORPORATION OF OHIO.

LOW-ALCOHOL YEAST PROCESS.

No Drawing.   Application filed October 30, 1920. Serial No. 420,835.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, a citizen of Germany, residing at Wilmersdorf, Germany, have invented certain new and useful Improvements in Low-Alcohol Yeast Processes (for which application for patent was filed in Germany April 12, 1915, Patent No. 304,241), of which the following is a specification.

This invention relates to a process for the manufacture of yeast, and more particularly to a so-called continuous process in which a nutrient solution is fed to a suspension of yeast, whereby yeast, such as compressed bakers' yeast, may be grown with the production of comparatively little alcohol as a by-product.

An object of this invention is to provide an improved procedure for the commercial production of yeast in a convenient and economical manner.

In my co-pending application, Serial No. 420,834, filed October 30, 1920, and the German Patent No. 303,221, which corresponds therewith, the seed yeast is added to water or a nutrient solution diluted to about 1° Balling, for example, in a rather high fermenting vat, the additional nutrient solution is slowly and substantially continuously supplied thereto at a rate such that all alcohol which may be formed may be assimilated by the yeast, and when a sufficient amount of propagating liquid has accumulated, the yeast and associated liquid is drawn off at the bottom of the vat at a rate which is substantially equal to the rate at which the fresh nutrient is supplied.

As is pointed out in the above mentioned co-pending application, the worts which may be used in this process may be of any type suitable for yeast propagation, as for example, the 12° Balling wort described in my first mentioned co-pending application No. 420,832, or the artificially prepared yeast nutrient solution comprising essentially sugar material and yeast nourishing inorganic salts, wherein the sugar is present to an amount of approximately 10% and the yeast nutrient salts may be present up to an amount of one-half of the sugar content, as described in my co-pending application No. 420,833. As an example of the last mentioned nutrient solution, the following is given:

Sugar 100 parts, ammonium sulfate 40 parts, acid potassium phosphate 9 parts, magnesium sulfate 1 part, calcium carbonate for neutralization about 30 parts; or Molasses (containing 50% sugar) 100 parts, ammonium sulfate 10 parts, superphosphate (having 18% water soluble phosphoric acid) 10 parts, magesium sulfate 0.5 parts, calcium carbonate for neutralization about 4 parts.

Moreover, although the worts described in my above mentioned co-pending applications are of gravities approximately 12° Balling, it was pointed out therein that worts of other concentration might be used, provided the rate of addition thereof be controlled so that the concentration of the propagating liquid would not rise above the point at which substantially all of the alcohol which might be formed would be assimilated by the yeast.

My present invention is distinguished from that of my aforesaid co-pending application Serial No. 420,834, inasmuch as, that at the very commencement of the operation as much seed yeast is provided in the liquid in which propagation is initiated as is on an average grown in, or as can grow in, this quantity of liquid, and that the drawing off of the yeast and the associated liquid is begun immediately after the starting of the propagation process. As an example of the manner of carrying out the process, the following is given:

The vessel in which the propagation is to be carried out and which is provided with suitable means for aeration and for drawing off the yeast at the bottom, is substantially filled with a suitable liquid which is nontoxic to yeast such as water or a dilute portion of the wort which is to be used, and is started with a quantity of yeast which must amount to at least 2 kilograms of compressed yeast per hectoliter, and which may be as high as 20 kilograms per hectoliter. The quantity of 2 kilograms corresponds to the yeast yield from mashed raw material amounting in the average from 30 to 40% per hectoliter of wort, which is obtained in the customary aerated yeast process. The quantity of 20 kilograms per hectoliter represents the maximum amount of yeast which can be grown in a hectoliter of wort, i. e., the point of what might be termed "saturation", at which no further propagation can be effected by any means whatsoever.

As soon as the yeast is distributed in the wort by aeration, the addition of fresh nutrient solution is begun in a manner that is substantially continuous and at a rate such that the concentration of the propagating liquid will not rise above that point at which substantially all of the alcohol which may be formed will be assimilated by the yeast, and the drawing off of the spent wort at the bottom of the propagating vessel is begun immediately. The spent wort containing the yeast is led to suitable separating means, such as centrifugals, and if the wort which is being added is sufficiently concentrated, the separated liquid or "beer" from the separating means is either all, or in part returned to the propagating vat. In this manner it will be evident that the addition of the concentrated wort, together with the amount of "beer" which is returned to the propagating vat, will be so regulated and proportioned that the concentration of the propagating solution will not be raised above the desired point, and that the amount of liquid added will be substantially equal to the amount drawn off at the bottom, so that the amount of propagating liquid present will be maintained substantially constant. Moreover the result obtained by the addition of the concentrated nutrient solution together with the separated liquid is substantially the same as would be obtained by the addition of a dilute nutrient solution.

In the use of the artificial nutrient solution described in my co-pending application, Serial No. 420,833, it is preferable that such amounts of an innocuous antacid or acid neutralizing substance be added to the propagating solution, that substantially all of the deleterious acid which is set free in the propagating solution is neutralized. This neutralizing agent may be added either separately or with the supply of yeast nutrient materials, as is set forth in my last mentioned co-pending application.

The advantages of this process as compared with the process described in my above mentioned co-pending application, Serial No. 420,834, and the corresponding German Patent No. 303,221, consists in the speeding up of the yeast production, inasmuch as the nutrient substances of the wort which is initially seeded with yeast, are consumed much more rapidly, so that shortly after the initiation of the propagation that desirable condition prevails which is only gradually attained in the case of the previous process.

In the manufacture of compressed yeast, the seeding of the wort in amounts up to 10% of the raw materials used (corresponding to about ½ kilogram compressed yeast to 1 hectoliter of wort) is already known so that in the case of an increase to 4 to 5 times the amount, the maximum number of yeast cells are obtained per unit of liquid. This figure cannot, however, be materially exceeded with the usual processes, since in view of the fact that the quantity of wort remains unchanged, the number of new cells and accordingly the yeast yield would be too small. An increase in the yeast growth to the degree mentioned in the process which constitutes my invention is made possible by the method of the gradual addition of fresh nutrient salts in combination with the constant drawing off of the yeast containing spent nutrient solution.

Having described my invention what I claim as new and desire to secure by Letters Patent is:

1. A continuous process of propagating yeast which comprises suspending seed yeast in a non-toxic aqueous liquid, aerating the liquid, adding during the period of propagation a nutrient solution containing all essential yeast nutrients, and simultaneously withdrawing the yeast containing solution.

2. A continuous process of propagating yeast which comprises suspending seed yeast in a non-toxic aqueous liquid, aerating the liquid, substantially continuously adding during the period of propagation a nutrient solution, and simultaneously and substantially continuously withdrawing the yeast containing solution at approximately the same rate at which the nutrient solution is added.

3. A continuous process of propagating yeast which comprises initiating the propagation of yeast in a dilute nutrient solution, aerating the solution, adding during the period of propagation a nutrient solution containing all essential yeast nutrients, and simultaneously withdrawing the yeast containing solution.

4. A continuous process of propagating yeast which comprises initiating the propagation of yeast in a dilute nutrient solution, aerating the solution, substantially continuously adding during the period of propagation a nutrient solution, and simultaneously and substantially continuously withdrawing the yeast containing solution at approximately the same rate at which the nutrient solution is added.

5. A continuous process of propagating yeast with a relatively low yield of alcohol which comprises initiating the propagation of yeast in a dilute nutrient solution, aerating the solution, substantially continuously adding during the period of propagation a nutrient solution of higher concentration at a rate such that the concentration of the propagating liquid does not rise above that at which substantially all of the alcohol which may be formed will be assimilated by the yeast, and simultaneously and substantially continuously withdrawing the yeast containing solution at approximately the same rate at which the nutrient solution is added.

6. A continuous process of propagating yeast which comprises preparing a nutrient solution containing all essential yeast nutrients, withdrawing a portion into a vat, diluting the portion, seeding the diluted portion with an amount of seed yeast which approximates the maximum amount which can be grown in such portion, aerating the diluted portion, substantially continuously adding during the period of propagation the nutrient solution of higher concentration, and simultaneously withdrawing the yeast containing solution from the vat at approximately the same rate at which the nutrient solution is added.

7. A continuous process of propagating yeast with a relatively low yield of alcohol which comprises preparing a nutrient solution containing all essential yeast nutrients, withdrawing a portion into a vat, diluting the portion, initiating propagation of yeast therein with aeration, substantially continuously adding during the period of propagation the nutrient solution of higher concentration at a rate such that the concentration of the propagating liquid does not rise above that at which substantially all of the alcohol which may be formed will be assimilated by the yeast, and simultaneously withdrawing the yeast containing solution from the vat at approximately the same rate at which the nutrient solution is added.

8. A continuous process of propagating yeast which comprises preparing a nutrient solution containing all essential yeast nutrients, withdrawing a portion into a vat, diluting the portion, seeding the diluted portion with an amount of seed yeast which approximates the maximum amount which can be grown in such portion, aerating the diluted portion, substantially continuously adding during the period of propagation the nutrient solution of higher concentration at a rate such that the concentration of the propagating liquid does not rise above that at which substantially all of the alcohol which may be formed will be assimilated by the yeast and simultaneously withdrawing the yeast containing solution from the vat at approximately the same rate at which the nutrient solution is added.

9. A continuous process of propagating yeast which comprises preparing a nutrient solution containing essentially sugar material and yeast nutrient salts from which components are liberated which tend increasingly to acidify the nutrient solution during propagation, withdrawing a portion into a vat, diluting the portion, initiating propagation of yeast therein with aeration, substantially continuously adding during the period of propagation the nutrient solution of higher concentration at a rate such that the concentration of the propagating liquid does not rise above that at which substantially all of the alcohol which may be formed will be assimilated by the yeast, simultaneously withdrawing the yeast containing solution from the vat at approximately the same rate at which the nutrient solution is added, and during the period of propagation neutralizing a substantial portion of such acidity by the addition of an innocuous antacid substance.

10. A continuous process of propagating yeast which comprises preparing a nutrient solution containing essentially sugar material and yeast nutrient salts from which components are liberated which tend increasingly to acidify the nutrient solution during propagation, withdrawing a portion into a vat, diluting the portion seeding the diluted portion with an amount of seed yeast which approximates the maximum amount which can be grown in such portion, aerating the diluted portion, substantially continuously adding during the period of propagation the nutrient solution of higher concentration at a rate such that the concentration of the propagating liquid does not rise above that at which substantially all of the alcohol which may be formed will be assimilated by the yeast, simultaneously withdrawing the yeast containing solution from the vat at approximately the same rate at which the nutrient solution is added, and during the period of propagation neutralizing a substantial portion of such acidity by the addition of an innocuous antacid substance.

11. A continuous process of propagating yeast which comprises preparing a nutrient solution containing all essential yeast nutrients, withdrawing a portion into a vat, diluting the portion, seeding the diluted portion with an amount of seed yeast which approximates the maximum amount which can be grown in such portion, aerating the diluted portion, substantially continuously adding during the period of propagation the nutrient solution of higher concentration, simultaneously withdrawing the yeast containing solution from the vat, separating the yeast from the withdrawn solution, and returning at least a portion of such solution to the propagating vat, the addition of the concentrated nutrient solution, the amount of withdrawn solution returned to the propagating vat and the rate of withdrawal being so controlled that the concentration of the propagating solution in the vat does not rise above that at which substantially all of the alcohol which may be formed is assimilated by the yeast.

12. A continuous process of propagating yeast which comprises preparing a nutrient solution containing sugar material and yeast nutrient salts from which components are liberated which tend increasingly to acidify the nutrient solution during the propagation, withdrawing a portion into a vat, diluting the portion, seeding the diluted portion with an amount of seed yeast which approximates the maximum amount which can be grown in such portion, aerating the diluted portion, substantially continuously adding during the period of propagation the nutrient solution of higher concentration, simultaneously withdrawing the yeast containing solution from the vat, separating the yeast from the withdrawn solution, returning at least a portion of such solution to the prapagating vat, and during the period of propagation, neutralizing a substantial portion of such acidity by the addition of an innocuous antacid substance, the addition of the concentrated nutrient solution, the amount of withdrawn solution returned to the propagating vat, and the rate of withdrawal being so controlled that the concentration of the propagating solution in the vat does not rise above that at which substantially all of the alcohol which may be formed is assimilated by the yeast.

In testimony whereof, I have affixed my signature.

FRIEDRICH HAYDUCK.